US006350382B1

United States Patent
Schick

(10) Patent No.: US 6,350,382 B1
(45) Date of Patent: Feb. 26, 2002

(54) ENHANCING FILTRATION YIELDS IN TANGENTIAL FLOW FILTRATION

(75) Inventor: Karl G. Schick, Verona, WI (US)

(73) Assignee: Scilog, Inc., Middleton, WI (US)

( * ) Notice: Subject to any disclaimer, the term of this patent is extended or adjusted under 35 U.S.C. 154(b) by 0 days.

(21) Appl. No.: 09/603,148

(22) Filed: Jun. 23, 2000

(51) Int. Cl.$^7$ ............................................... B01D 61/12
(52) U.S. Cl. ........................... 210/637; 210/87; 210/90; 210/134; 210/137; 210/321.65; 210/416.1; 210/650; 210/805
(58) Field of Search ........................... 210/87, 90, 134, 210/137, 195.2, 257.2, 637, 650, 739, 741, 805, 258, 321.65, 416.1, 103

(56) References Cited

U.S. PATENT DOCUMENTS

| | | | | |
|---|---|---|---|---|
| 4,680,109 A | * | 7/1987 | Yamada et al. | 210/103 |
| 4,818,384 A | | 4/1989 | Mayer | |
| 5,076,931 A | * | 12/1991 | Muller | 210/637 |
| 5,112,489 A | * | 5/1992 | Hartmann | 210/637 |
| 5,200,090 A | | 4/1993 | Ford et al. | |
| 5,328,584 A | | 7/1994 | Erickson et al. | |
| 5,340,290 A | | 8/1994 | Clemens | |
| 5,431,811 A | | 7/1995 | Tusini et al. | |
| 5,520,816 A | | 5/1996 | Kuepper | |
| 5,589,076 A | * | 12/1996 | Womack | 210/739 |
| 5,597,486 A | * | 1/1997 | Lutz | 210/650 |
| 5,693,229 A | * | 12/1997 | Hartmann | 210/650 |
| 5,776,345 A | | 7/1998 | Truitt et al. | |
| 5,791,880 A | | 8/1998 | Wilson | |
| 5,947,689 A | | 9/1999 | Schick | |

OTHER PUBLICATIONS

Technical Bulletin: *MidGee™ Cross Flow Filters*, A/G Technology Corporation, 1996.
Operations Manual: *MiniKros Sampler System*, Microgon Inc., 1995.
Technical Bulletin: *The MiniKros® Sampler System*, Spectrum Microgon, 5/96.
Technical Bulletin: *Microgon Techniques for Processing Uniform Latex Particles,* Microgon Inc., 1992.
William F. Blatt, Lita Nelsen, Eliseo M. Zipiliyan, and Mark C. Porter, Rapid Salt Exchange by Coupled Ultratiltration and Dialysis in Anisotropic Hollow Fibers, Separation Science, 7(3) pp. 271–284, 1972.
W.F. Blatt, S.M.Robinson, and Harris J. Bixler, Membrane Ultrafiltration: The Diafiltration Technique and its Microsolute Exchange and Binding Phenomena. Analytical Biochemistry, 26, pp. 151–173, 1968.
William F. Bowers and Rudy H. Haschmeyer, A Versatile Small–Volume Ultrafiltration Cell. Analytical Biochemistry, 25, pp. 549–556, 1968.

* cited by examiner

Primary Examiner—Joseph W. Drodge
(74) Attorney, Agent, or Firm—Cook, Alex, McFarron, Manzo, Cummings & Mehler, Ltd.

(57) ABSTRACT

A system is provided for proceeding with filtration of liquids in a manner having enhanced control characteristics. Yields are enhanced. The system and method can be used to maintain a substantially constant trans-membrane pressure. When desired, that constant trans-membrane pressure is especially well-suited to yield enhancement for the particular liquid being filtered, concentrated or collected, while minimizing a risk of damage to or loss of valuable components. Additionally, a constant feed rate or pump output can be maintained. Approaches also are described for determining optimal filtration conditions, including trans-membrane pressure and feed rate. Also described is a system and method for determining pressures in a pulsating system with enhanced accuracy by using a peak pressure mode.

30 Claims, 3 Drawing Sheets

ENHANCING FILTRATION YIELDS IN TANGENTIAL FLOW FILTRATION

BACKGROUND AND DESCRIPTION OF THE INVENTION

The invention generally relates to the filtration of liquids, more particularly to high precision separation suitable for use in the pharmaceutical and biotechnology industries. The invention is especially applicable to filtration through a porous membrane sheet or a porous hollow fiber column. With the invention, a variety of separation techniques are handled in a yield-enhancing manner and can be automated, including having the separation proceed until a desired level of concentration or other characteristic or parameter is attained. The invention enhances separation processes such as microfiltration, microparticle coating and washing, ultrafiltration, diafiltration and certain preparative chromatography applications. It also improves yield in automated viral infection of mammalian cells such as in gene therapy research and development, as well as rapid cell separation, protein clarification and protein concentration.

In the pharmaceutical and biotechnology industries, the use of micro-filtration, ultrafiltration, tangential or cross-flow filtration, as well as constant volume diafiltration are well-established methods for the separation of dissolved molecules and/or suspended particulates. Typically, the liquid to be filtered is forced through a porous membrane sheet or a porous hollow fiber column. Such sheets or membranes are commercially available in different pore sizes. Depending upon the selected pore size, molecules or particulates smaller than the average membrane or column pore size will pass, together with solvent for example, through the membrane or hollow fiber walls. These molecules or particulates are collected as filtrate, while the retentate is left behind. In many filtration approaches, such as those incorporating ultrafiltration or other after tangential-flow filtration devices, the retentate is repeatedly re-circulated with the objective of improving filtration efficiency and enhancing the yield of the filtrate or permeate.

However, filtration devices tend to clog when used over an extended period of time and must be timely replaced. Clogging of a filtration device occurs when the membrane pores become obstructed, typically with trapped cells, particulate matter, cell debris or the like. This clogging of the pores results in a decreased liquid flow across the porous membrane sheet or hollow fiber column wall. The result is a change in the trans-membrane pressure (TMP) which, if not properly addressed, runs the risk of serious detriment to the operation which incorporates the filtration procedure.

Attempts to address these concerns and difficulties have included the development and use of semi-automated filtration systems. These types of systems utilized either manually controlled recirculation pumps or pumps which are controlled by a timing device which will stop pump action after a preset filtration time has elapsed. It is also typical to monitor line pressure through the use of an analog or a digital pressure gauge, usually located between the pump and the filter device. When the gauge reads a certain pressure level, typically one specified by the manufacturer of the filter device, the filtration must be stopped and the old filter must be replaced with a new one. At times, it is not possible to accurately predict the time at which the pumping action must be stopped in order to avoid overtaxing the filter device. Accordingly, prior art systems which rely solely on timing are not entirely satisfactory.

Prior art filtration technology such as that referred to above also is disadvantageous because it is typically very labor intensive. This prior technology also has additional, serious shortcomings for safe and efficient operation. One shortcoming is that the filtrate yield is frequently not quantitative because of unpredictable solution particulate loads. Thus, for a given re-circulation volume and pump rate, the filtrate yield may differ from case to case, depending upon the amount of pore-sized particulate suspended in the recirculation solution. Another shortcoming is a direct result of back pressure build up due to clogging and gel layer formation. Rapid back pressure build up at times causes bursting of the filter membrane and/or the filter housing, resulting in costly spillage and/or filtrate contamination. Excessive filter inlet pressure also frequently leads to blow-off of tube connections such as at the filter inlet, resulting in costly spillage of retentate, for example. Because of these types of shortcomings, manual and semi-automated filtration systems need to be constantly monitored, which greatly contributes to the high labor intensity of such approaches.

Filtration arrangements as described in Schick U.S. Pat. No. 5,947,689, incorporated hereinto by reference, provide for quantitative capability with TMP pressure monitoring. Such a filtration approach allows for rapid and safe filtration without concern of losing product, particularly pharmaceutical products or biotechnology products which can be extremely expensive, difficult to replace, and can represent the investment of many hours of prior processing. This patent describes coaxing the maximum life out of a filtration device without running the risk of generating operational conditions which can lead to excessive back pressure build up near the end of the life of the filtration device.

It has been found that, by proceeding in accordance with the present invention, it is possible to achieve quantitative filtration of liquids in an automated, safe, labor unintensive manner, all while enhancing the yield of the operation while determining and maintaining parameter values of the filtration system such as trans-membrane pressure, pump output and beneficial filtration conditions.

SUMMARY OF THE INVENTION

The system of the present includes a reservoir which contains the liquid to be filtered, typically including valuable pharmaceutical or biotechnological material which needs to be concentrated or separated from a liquid component, such as a media, a carrier, a reaction solution, or other liquid component and which are in need of separation in accordance with precise filtration techniques. A conduit system directs this liquid into a filtration unit through the action of a processor-controlled pump unit. In a preferred embodiment, at least one pressure sensor is positioned along the conduit system. The processor-controlled pump unit is capable of maintaining constant trans-membrane pressure and/or pump output, determining optimal filtration conditions, and/or monitoring pressures using a peak pressure mode for determining accurate trans-membrane pressures.

It is a general object of the present invention to provide an improved automated, quantitative liquid filtration apparatus and method suitable for precisely handling filtration of pharmaceutical and/or biotechnology materials.

Another object of the present invention is to provide an improved apparatus and method for exacting filtration of liquids through a constant pressure mode which enhances yield of collected components.

Another object of this invention is to provide an improved apparatus and method for the filtration of liquids which vary filter inlet pressure in accordance with a varying level of resistance to flow (increase in fluid viscosity) which develops within the system, particularly the filtration unit.

Another object of the present invention is to provide an improved liquid filtration system and method which are automated and need not be constantly monitored by an operator, thereby being characterized as having very low labor intensity.

Another object of the present invention is to provide improved filtration which includes the use of logic data flow which adjusts pump output in response to changing viscosity of the liquid being filtered.

Another object of the present invention is to provide an improved concentration system or method for adjusting filter retentate output flow in order to maintain optimal product flow in response to changing product characteristics, e.g. increase in fluid viscosity due to removal of solvent.

These and other objects, features and advantages of the present invention will be clearly understood through a consideration of the following detailed description.

BRIEF DESCRIPTION OF THE DRAWINGS

In the course of this description, reference will be made to the attached drawings, wherein.

DESCRIPTION OF THE PARTICULAR EMBODIMENTS

Figure 1:
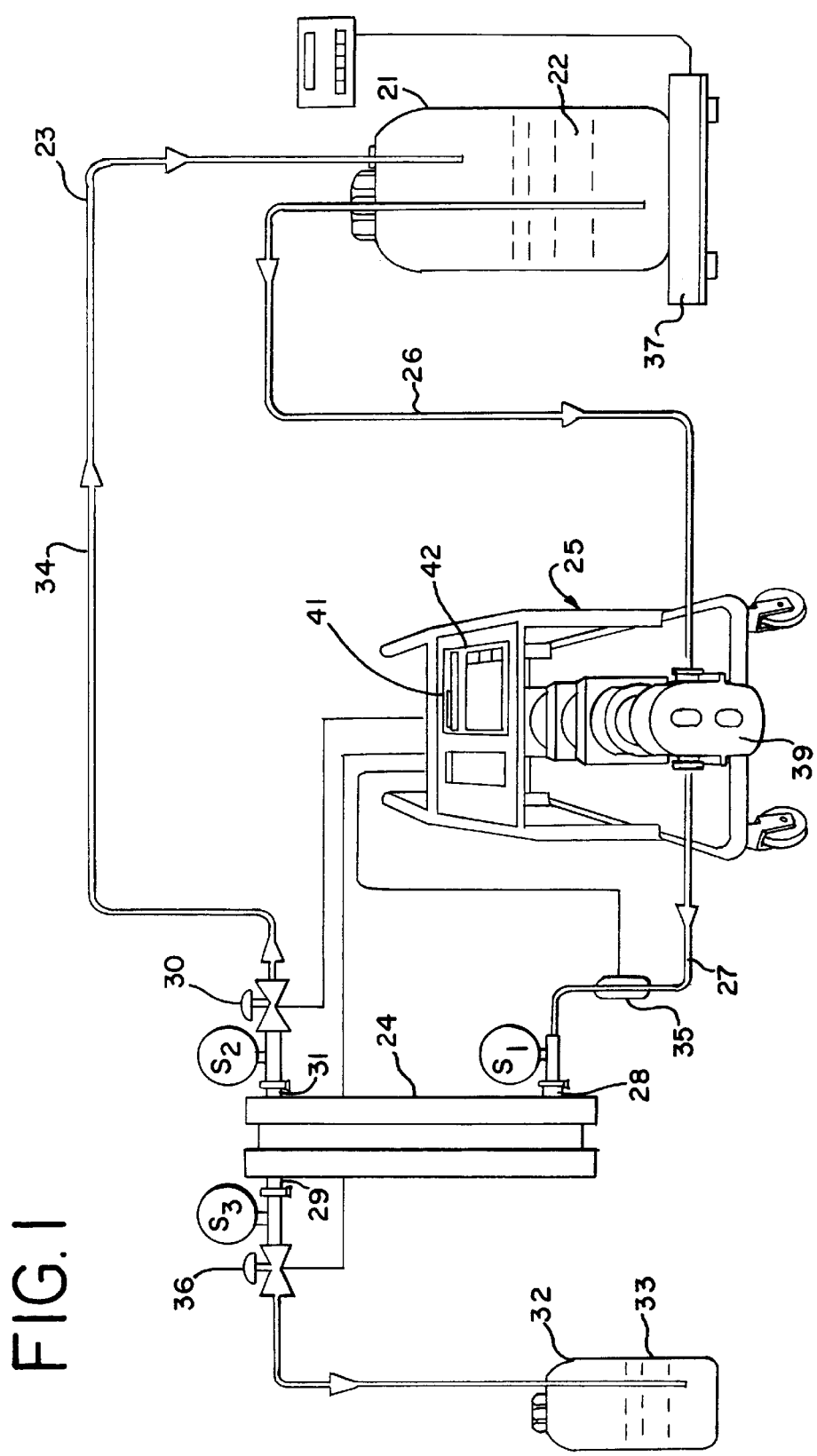
FIG. 1 is a somewhat schematic illustration of an apparatus of the type discussed herein which is especially suitable for ultrafiltration types of applications.

A system particularly designed for ultrafiltration, microfiltration and the like is illustrated in FIG. 1. A reservoir 21 for containing a liquid to be filtered 22 is shown in liquid-passing communication with a conduit system, generally designated at 23. A filtration unit 24 is also positioned along the conduit system, as is a processor-controlled pump unit 25.

In this illustrated arrangement, the conduit system 23 includes various lengths of conduit or tubing, such as a conduit length 26 by which liquid 22 passes out of the reservoir 21 by the action of the pump unit 25 on the conduit. In a typical application, the conduit system is comprised primarily of scientific or medical tubing which is acted upon by movement-generating components of the pump unit 25. This conduit length 26 opens into a conduit length 27 to complete passage of the liquid 22 from the reservoir to the filtration unit 24. Tubing includes PharMed and Masterflex® silicone pump tubing.

With more particular reference to the filtration unit 24, this includes an inlet 28, a filtrate outlet 29, and a retentate outlet 31. A collector 32 is preferably provided for collecting the filtrate (or permeate) 33 which, by operation of the filtration unit, is separated from the liquid 22 and flows out of the filtrate outlet 25. Retentate which flows out of the retentate outlet 31 is returned to the reservoir by a recycle component 34 of the conduit system 23.

Filtration unit 24 often will take the form of a tangential or cross-flow filtration device. Other filtration units can be used, including those characterized as having an ultrafiltration column. The filter units may be of the type wherein the liquid to be filtered encounters a porous membrane. The preferred filter unit is of the type which incorporates porous hollow fibers, and the flow of liquid is of a generally tangential type or cross-flow type. These filtration units are of types which are generally known. They have a variety of pore sizes which are selected to achieve the desired separation action. Commercially available filtration units include those which are stacked plate and spiral devices which use flat sheet membranes. Others include tubular devices, as well as shell and tube devices which use hollow fiber membranes. Cross-flow or tangential ultrafiltration, diafiltration or dialysis filter units operate on the principle of providing high fluid flow velocity parallel to the membrane surface. Tangential ultrafiltration generally operates best at relatively high velocity flow rates.

Proper functioning of these filtration units is severely hampered as the viscosity and concentration of the circulating retentate increases as its concentration increases. If not properly addressed, this can result in inefficiencies, including the development of an excessive gel layer of solids and/or micromolecules. This buildup is intensified by reducing flow rate in an attempt to address increased viscosity, which gradually and persistently decreases the filtration efficiency and capacity of the filter unit. If proper measures are not taken to effectively address fluctuation and inadequate monitoring of trans-membrane pressure, such as those in accordance with the invention, yield and processing times will be negatively impacted.

In addition, if left unchecked, increasing line pressure or TMP will eventually cause failure and/or leakage in the closed system. Typically, pressure induced failure will be evident in the filter unit and/or in the conduit system. For example, the filter unit and tubing of the conduit system can fail due to excessive internally applied pressure. Alternatively or additionally, seals between the conduit system and other components of the apparatus can fail, and/or the tubing can be blown off of a seat or connection point. Such events will lead to loss of valuable components and potential contamination of the theretofore closed system.

The system illustrated in FIG. 1 further includes at least one flow meter 35 within the conduit system. Suitable in this regard is an electronic flow transmitter, such as a Burkert Model SE35/8035 having a 4–20 mA output. Pressure sensors (S1, S2 and S3) are also shown installed along the conduit system. Sensor S1 reads the pressure (P1) at the inlet 28. Sensor S2 reads the pressure (P2) at the retentate outlet 31, and sensor S3 reads the pressure (P3) at the filtrate outlet 29. In tangential flow filtration, the driving force (trans-membrane pressure, or TMP) is the difference between the average of the membrane feed pressure (P1) and the retentate pressure (P2) minus the permeate pressure (P3).

$$TMP = (P1 + P2)/2 - P3 \qquad (1)$$

In tangential flow applications where the pump feed pressure (P1), the retentate pressure (P2) and the permeate pressure (P3) are all allowed to change, equation (1) defines the trans membrane pressure (TMP). Appropriate differential pressure measurements can be made.

Preferably, each pressure sensor is an electronic pressure sensor which detects pressure within the conduit system at its particular location. Means are also provided for transmitting pressure data from each pressure sensor to the processor-controlled pump unit 25. In this manner, the processor-controlled pump unit 25 has virtually instantaneous access to this pressure data. Suitable in-line, electronic liquid pressure sensors are generally known and are available. An example is the Flow-Through pressure sensor, available from Scilog Inc. Often, such a pressure sensor is electronically connected to a preamplifier, which in turn is mounted to an in-out port on the processor-controlled pump unit 25.

At least one valve unit is provided for adjusting pressures within the system. In the illustrated embodiment, a valve 30 is associated with the sensor S2 in order to provide the ability to adjust pressure (P2), and a valve 36 is associated with the sensor S3 for adjusting pressure (P3). A valve also can be associated with the sensor S1. Preferably, the rate of flow into filtration unit 24 is monitored by the flow meter 35 upstream of inlet 28. Each is in signal transmitting communication with the processor component, as generally shown in FIG. 1.

For a given process solution and membrane, an optimal trans-membrane pressure can be empirically determined. The unit according to the invention permits this optimal TMP to be maintained during the process even during increasing concentration of the component of interest in the recirculating system, which increases the viscosity of the recirculating liquid containing the component of interest. Because the system continues to operate at the best TMP for the filter and feed liquid, yield is enhanced while the unit operates in a safe manner to avoid loss of valuable components. This is done while maintaining a flow rate which avoids undesirable increase in gel-layer formation.

When desired, weight data can be input to the processor-controlled pump unit. FIG. 1 illustrates an electronic top-loading balance 37 positioned and adjusted for measuring the weight of the liquid 22 within the reservoir 21. These weight data are electronically transferred to the processor-controlled pump unit 25. When it is desired to measure or weigh the filtrate or permeate which is collected within the collector 32, means are so provided. With the arrangement using balance 37 as illustrated in FIG. 1, this can be reasonably well accomplished by measuring the decrease in the weight of the liquid within the reservoir 21. Alternatively or additionally, a balance (not shown) can be positioned for directly measuring the weight of the filtrate or permeate 33. Generally speaking, the use of the extra balance allows for enhanced quantitative measurement of the filtrate or permeate. It will be appreciated that the somewhat indirect measurement by monitoring the decrease in the liquid 22 in the reservoir 21 must take into account liquid remaining within the conduit system and the filtration unit, which amounts are not necessarily totally consistent throughout the processing procedure. Various electronic balances can be used. These include the electronic top-loading balances and scales made by manufacturers such as: Mettler® Toledo Sartorius® and Ohaus® and Scilog, Inc.

Referring more particularly to the processor-controlled pump unit 25, the illustrated device includes a pump head 39. Pump head can be a peristaltic pump, a lobe pump or other precision pump head. The pump head can be of a two-channel variety, such as a Tandem (Trademark) peristaltic pump head available from Scilog, Inc., Madison, Wis. Two-channel peristaltic pump heads in this regard are described in U.S. Pat. No. 5,340,290, incorporated by reference hereinto. Whatever type of pump unit is used, it is important that it be exceptionally accurate so as to impart a precise flow rate to the liquid in accordance with instructions received from the processor component of the processor-controlled pump unit 25. For example, the Tandem pump can accurately move from between about 2 ml/min to about 2200 ml/min per channel.

The processor-controlled pump unit 25 includes a processor component 41. A control and display panel 42 provides the interface between the user and the processor 41. Included is a display and a series of operator activated controls. These controls allow the operator to input parameters and instructions in accordance with the particular needs of the liquid being subjected to the separation capabilities of the filtration system. The illustrated front panel user interface includes an alphanumeric liquid crystal display (LCD) and a membrane keypad to select operational modes and alarm settings.

Suitable keypad arrangements can be provided. They can include a "soft" key to scroll up or down through the menus. They can include "hard" keys whose function does not change. These keys are used for basic control and programming. A RUN control key executes the selected operational mode and starts the pump 39. A STOP control key interrupts current operational mode and stops the pump. A RATE control key sets the pump rate in ml/min, liters/min or kg/min. A TIME control key displays motor pulses per second. A double arrowhead control key orders clockwise or counterclockwise pump direction. A SWITCH control key and an EXIT control key typically are provided. A STAR (*) control key can be used in pump rate recalibration and also for changing the parameter displayed by the processor control pump unit.

Figure 3:
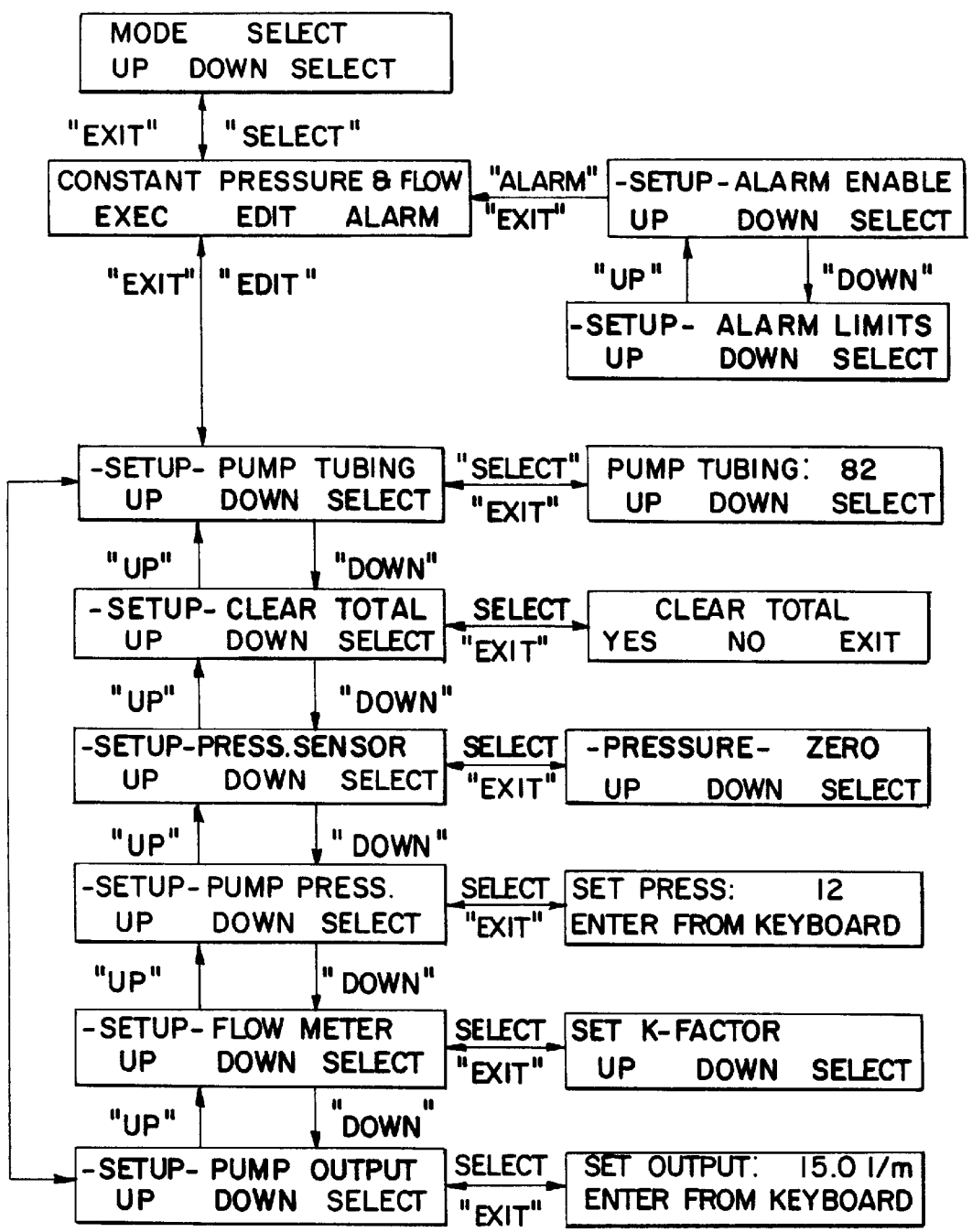
FIG. 3 schematically provides a menu overview of software suitable for use in the processor-controlled pump unit.

FIG. 3 shows a preferred main menu for the logic of the processor, which can control data channel circuitry, which consists of five operational modes. "Up" and "Down" keys are used to scroll through the main menu. Pressing a "Select" key enters a chosen operational mode and enters the first submenu level which provides access to the "Exec" and "Edit" functions. In the "Edit" submode, the pump parameters are selected for filter application. Pressing "Exit" returns to the main menu.

The illustrated operation mode implements, constant trans-membrane pressure (TMP). A pump rate user-defined TMP can be selected. In the "Edit" submode the pump tubing is selected, and the factory installed calibration tables which relate the pump output in 1/min to pump motor speed are selected. In the constant pump rate mode, pump rates in terms of 1/min are selected. User-programmable alarm parameters can be selected, such as: Cumulative (Retentate) Volume; Run (Pump) Time; Low Pressure (Low Filter Back Pressure); High Pressure (High Filter Back Pressure); Filtrate (or Permeate) Weight Alarm.

The SETUP operation mode allows the user to select various user preferences and interface options. A Setup: Scale submode provides electronic balance options. A Setup: System Test submode allows check-out of outputs. A Setup: Printer is used for setting up the printer communications parameters, while Setup: Pump allows the user to set various pump user preferences. A Setup: Serial can be provided to define communications parameters of the SERIAL mode. MANUAL allows manual pump speed control, and SERIAL allows remote control of the pump.

A typical operation of the filtration system as illustrated in FIG. 1 now will be described, with reference being made to the data flow schematic of FIG. 2. This arrangement illustrates how trans-membrane pressure can remain constant while the viscosity of the feed solution increases during its ultrafiltration.

As described in more detail in U.S. Pat. No. 5,947,689, the filter line pressures and/or TMP as well as the filtrate weight can be continuously monitored. For example, when the line pressure limit is exceeded by a set alarm value, the processor-controlled pump unit will stop pumping and/or provide an alarm signal. An optical encoder and associated circuitry are preferably provided to count and control the pump motor rotations necessary to implement a selected pump rate. The illustrated processor component 41 incorporates a microprocessor-based controller, and a battery-backed EPROM stores the filtration control software. The software includes a calibration table which relates the pump motor rate (RPM) value with the pump output in terms of 1/min or ml/min. Typically, a calibration table includes data to ensure an accurate volume per number of pump motor turns for a particular tube size. Thus, the operator selects the pump tubing by number (e.g. in accordance with standard pump tubing values in the table). Processor component 41 contains a permanent, factory installed calibration table for each pump tube size. The calibration table relates the pump motor RPM to the pump output in terms of 1/min or ml/min. Recalibration capabilities can adjust for differences in pump tube formulation/manufacture, as well as pump tube wear over time which may cause the pump output to change.

In the illustrated embodiment, at least five different alarm parameters are programmable by the operator by operation of the control logic and/or its limit-setting data logic. These user-selected alarm parameters include a high pressure alarm limit to monitor plug-up conditions of the filtration device, typically associated with the pressure sensor 35. A low pressure alarm limit also is programmable in order to monitor sudden lowering of pressure within the system, such as when tube connections have failed and the process solution possibly is being lost. This function can be responsive to data received from one or more pressure sensors.

A filtrate weight alarm limit also can be set in order to quantitatively monitor the amount of solution collected in the collector 32. When the filtrate weight is directly measured, a stop and/or alarm function will proceed when that limit amount is attained. When the filtrate weight is to be indirectly monitored by virtue of weight data obtained from electronic top loading balance 37, the filtrate yield is calculated by the software based upon the weight differential of the liquid in the reservoir 21 at time=0 (start of filtration) and at some later time. The operator can also set a run time alarm to stop or signal when a user-defined filtration time has elapsed. A retentate volume alarm limit also can be set in order to monitor the solution volume which is pumped by the pump head 39.

For any of these alarm parameters, the operator can select one of three options: Alarm Off, Signal Only or Pump Stop. The latter can be combined with emitting a signal as well. The signal can be audible, vibrational and/or visible. All of the options except for Alarm Off are implemented when the operator-defined alarm limits are exceeded. For example, when the high pressure limit is set at 10.0 psi, the processor-controlled pump unit 25 will stop and/or provide an alarm signal when the filter back pressure, typically as measured at the pressure sensor 35, exceeds 10.0 psi. Editing details are shown in FIG. 3. Pressing the "Up" and "Down" keys makes a selection, and "Select" is pressed to implement that selection of alarm values or initial settings for the unit. Appropriate software and hardware are provided in a conventional manner in order to permit a printout by way of a printer (not shown) of desired parameters. Typical parameters thus reported or readily calculated are elapsed filtration time in minutes, feed rate, collected filtrate weight in grams, retentate volume in milliliters, trans-membrane pressure, pressures at each pressure sensor, control valve settings, as well as pump status changes and alarms as they occur.

With further reference to the ability of the filtration system of the invention to achieve constant trans-membrane filtration despite increasing viscosity, the pressure data, as well as other data noted, are continuously fed back to the processor component 41. The processor component continuously inputs the data into, in effect, equation (1). The unit then transmits a signal or signals in order to modify the appropriate pressure so as to maintain the constant TMP value. The signal can be to modify pump speed and/or to modify the size of the valve passageway, such as in either or both of the valves 30, 36. In essence, as the viscosity of the recirculating liquid increases, the TMP would increase without decreasing the pump speed and/or manipulating the valve(s).

Valves used in this connection preferably are motor-driven, multi-turn valves. A 4–20 mA (or 0–5 volt DC) analog signal moves the valve in the open direction or the closed direction. For example, with a valve in which a 4 mA signal will completely close the valve and a 20 mA signal will completely open the valve, a 12 mA signal would leave the valve half open. Thus, without modifying the pump rate into the filtration unit, the valves can be used to modify the pressure drop across the filtration unit at either or both outlet passages. An example of a suitable combination to achieve this is a SciPro smart controller available from Scilog, Inc., Madison, Wis., together with equipment such as the motor-driven, multi-turn valves which are diaphragm valves or needle valves. A suitable flow meter is of the in-line type which is electronically monitored.

In determining trans-membrane pressure, the inlet pressure at sensor S1 is determined largely by the dimensions and porosity of the tangential-flow filtration device (when that type of device is used), the viscosity of the liquid being pumped, and the pump rate. For example, pressure at sensor S1 is increased by increasing the pump rate noted by the flow meter 35. Sensor S2 monitors the pressure P2, which can be adjusted by sending a signal to the valve 30 for modifying the retentate outlet pressure. Sensor S3 monitors the pressure P3 at the filtration outlet 29, which can be modified by operation of the valve 36.

As liquids or solutions are moved through the pumphead 39, the pump output will vary with changes in the solution viscosity and with changes in the back-pressure at the filtration unit inlet 28. When it is desired to maintain a constant pump output, the flow out of the pumphead and into the inlet 28 will be monitored by the flow meter 35. When the flow is reduced for either reason, flow can be increased by speeding up the pumphead, for example, until the flow meter indicates that the desired flow level is occurring. If no adjustments are made regarding trans-membrane pressure, maintaining a constant pump output can affect the trans-membrane pressure. If it is desired to avoid such a change in TMP, the TMP can be maintained as discussed hereinabove.

The inlet pressure P1 is a variable that is dependent primarily on the pump rate, viscosity of the liquid being pumped, and the physical dimensions of the tangential-flow device. The rate of feed into the tangential-flow device controls the formation of the filter gel layer. Such a gel layer retards filtrate flux across the membrane. A typical filter is accompanied by manufacturer's guidelines for filtration feed rate. Measuring permeate collection rate at various feed rates allows one to experimentally determine the minimum tangential velocity or minimum feed rate for the particular system. The feed rate just prior to the one resulting in a significant drop of permeate collection rate is the minimum feed rate for the filtration system.

Permeate collection rate can be monitored by using flow sensors or scales. For example, the permeate collection rate can be established by monitoring the retentate reservoir weight or by electronically monitoring the permeate flow rate. Any decrease in reservoir weight is due to removal of permeate. Alternatively, the collection rate can be determined by monitoring the weight of the permeate collection reservoir over time. However determined, the permeate collection rate is continuously monitored and displayed, together with the pressures, the TMP and the feed rate. This is accomplished by the processor component 41.

By using the equipment and method, optimal TMP conditions for a given process solution and filtration device can be determined. This information can be readily obtained by monitoring the solution being processed by the equipment and method. The permeate collection rate is monitored while modifying one variable at a time, particularly the variables of feed rate, P1, P2 and P3. In this instance, the set of variables are optimal (meaning they provide the optimal trans-membrane pressure condition) when the permeate collection rate has been maximized while staying within the safety limitations of the filtration device.

It is important to avoid excessive trans-membrane pressures. This avoids exceeding the pressure limits of the filtration system, leading to a safety concern, while also threatening the physical integrity of living cells, for example in case of cell suspensions or the like. The relationship between solution viscosity, trans-membrane pressure and permeate flow through a microporis membrane can be described by the Hagen-Poiseuille Law:

$$J=ER(TMP)/8VX,$$

where J is the permeate rate (flux), E is the membrane porosity, R is mean pore radius, V is the viscosity of the fluid, and X is the thickness of the membrane. It will be noted that, for a constant permeate rate, any increase in solution viscosity will give rise to a proportional increase in trans-membrane pressure.

The present filtration approach is particularly advantageous in the concentration of cell suspensions. Solvent is continuously removed as filtrate, thereby increasing the concentration and viscosity of the remaining retentate. Increasing retentate viscosity modifies the TMP. Reducing the pump rate into the filtration device would significantly increase gel-layer formation and thus reduce filtrate yield. By means of the monitoring of pressures and TMP and adjusting the valves and/or pump rate, the optimal TMP which has been determined for the particular system is maintained, thereby providing optimal filtration conditions which are automatically and safely maintained while providing high filtrate yields. These are achieved because the system maintains the best trans-membrane pressure substantially throughout the process in order to remove the most material being collected under the most favorable conditions and within the minimum time to collect the volume.

The system and method provides the ability to accurately measure P1, P2 and P3 over a wide range of conditions. It is important that the pressures be determined with sufficient accuracy and precision to allow simultaneous calculation and display of the actual trans-membrane pressure. When the system incorporates pulsating filtration pumps such as peristaltic pumps and lobe pumps, pulsating outputs result in oscillating pressure readings which may vary by as much as +/−10 psi. This undesirable oscillation can be successfully addressed by logic preferably provided by the system. Each pulse generated by the pump is associated with a peak pressure value, a lowest pressure value, and values in between. Lack of precision and accuracy results unless results are taken to address this oscillation. A commercially available "capture and hold" algorithm is used to select only the peak pressure value for each analog signal. These peak pressures are thus selected, displayed and used to calculate the trans-membrane pressure. The system automatically updates these peak pressures with each pulse generated by pump. For a given pump output, the peak pressure values are extremely reproducible (a variation of less than 1%), allowing for accurate and precise TMP calculation.

Figure 2:
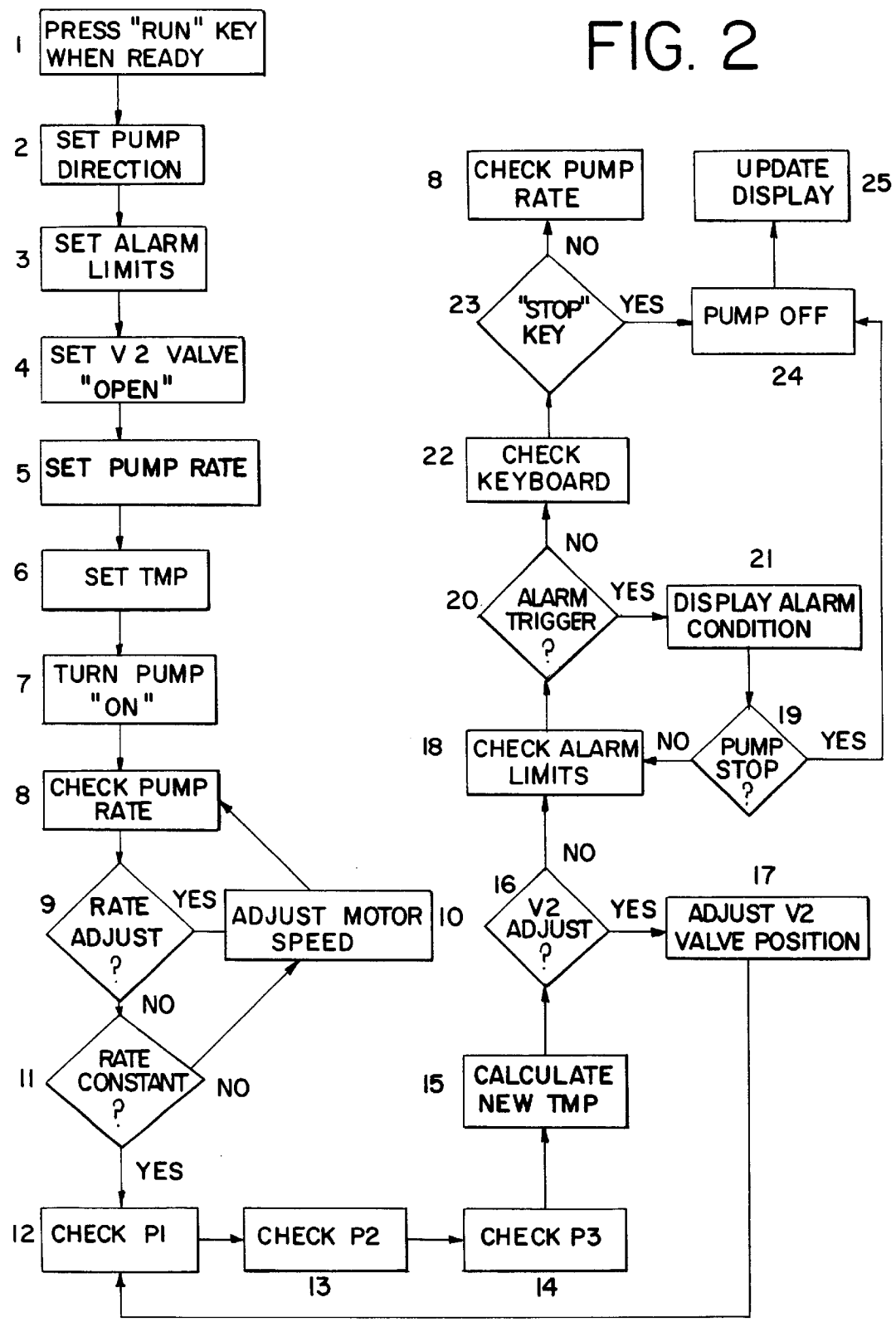
FIG. 2 is a schematic data flow chart associated with a system for maintaining filtration under constant trans-membrane pressure conditions by modifying pump rate and/or valve restrictions.

Referring especially to the data flow logic illustrated in FIG. 2 for the preferred embodiment, desired settings are made with respect to pump direction, any desired alarm limits, and the like, such as by using a selection menu illustrated in FIG. 3. This includes setting the pump rate and the TMP previously determined to be optimal for the particular filtration system and process solution. Full filter outlet flow is initially provided, such as by having a partially open valve at outlet sensor S2. With the process solution within the reservoir, the pumping is initiated.

If the unit is to be used in a manner so as to maintain a constant pump output, the pump rate is monitored such as by the flow meter 35. If the pump rate varies, the motor speed of the pump head is adjusted to maintain the constant rate.

During operation of the unit, pressures P1, P2 and P3 are monitored and are constantly used to calculate the current TMP. If the TMP begins to fluctuate from its set, optimum value, valve adjustments automatically are made. A typical adjustment is at sensor S2, and this is illustrated in FIG. 2. There is feedback as to the effect of this adjustment on each of the pressures, the TMP value is checked and, if constant, processing continues. If an alarm limit has been set, this can be triggered to provide an audible and/or visual signal or to turn off the pump unit.

In a general example of the system and method, a process solution, containing components to be separated by filtration, is pumped into the filtration unit 24, a tangential-flow filter. This filter unit includes one or more porous membrane sheets arranged in such a way that process solution flows parallel to the membrane surface and exits at the retentate outlet. Solvent, molecules, and particles smaller than the membrane pores pass through the membrane and are collected as permeate through the filtrate outlet 29. For each pass through the filtration unit, only a small portion of the total process solution is collected as permeate, while the remainder as returned to the process solution reservoir 22 and re-circulated by the processor controlled pump unit 25. More specific examples in this regard follow.

EXAMPLE 1

This example illustrates how the system was used to separate extracellular protein (IgG) from a suspension of cells. In this example, a 500 liter suspension of Chinese Hamster Ovary (CHO) cells was the process solution placed within the reservoir 21. The filtration system included a SciPro processor controlled pump unit having a peristaltic pumphead from Cole-Parmar, and an I/P High Precision pumphead. The filtration unit was a Sartocon II cross-flow filtration system available from Sartorius using a 0.45 micrometer Hydrosat cassette. The processor unit was set with the following operating conditions: the cell concentration within the 500 liter batch was 3×10 to the $6^{th}$ cells/ml. The membrane surface area was 0.6 m$^2$, with the cross-flow recirculation rate being 12 liters/min using a number 88 Masterflex™. The inlet pressure (P1) was initially 10 psi; the retentate pressure (P2) was initially 5 psi; and the permeate pressure (P3) was initially 2.5 psi, achieved by adjusting valve 36. The constant trans-membrane pressure was 5.0 psi. Cell-free media was collected as permeate, while the retentate contained the cell suspension, which became increasingly concentrated as the filtration progressed.

The cell suspension was concentrated 250 times, down to 2.0 liters over a 3.5 hour processing time period. The inlet pressure remained constant for the first 2.5 hours, and slowly increased to 15 psi during the last hour of processing. This increase in the inlet pressure was due to the increased cell density and the associated viscosity increase of the retentate. In response to this increased inlet pressure, the valve 30 at the Sensor S2 progressively opened, resulting in a simultaneous decrease in the retentate pressure through the outlet 31, which was required to maintain the TMP constant at 5.0 psi. The permeate pressure flow by the sensor S3 remain constant at 2.5 throughout the filtration run. The average system flux over the 3.5 hours was 237 liters/hr-m$^2$ at the TMP of 5 psi.

The concentration of the cell suspension was accomplished without affecting the viability of the cells, which was confirmed by the successful utilization of the cells in a subsequent procedure.

EXAMPLE 2

The 498 liters of media collected in Example 1 were subjected to a subsequent step of a multi-step separation strategy. The collected media containing the extra-cellular protein (IgG) was concentrated by ultrafiltration within the same type of system. The particular system also included a SciPro processor controlled pump unit of Scilog, Inc., having a Fristam Model 55S lobe pumphead. This system was used to concentrate the dilute protein solution from 498 liters to 2.0 liters, a concentration of approximately 250 times. The filtration system was a Sartocon II cross-flow filtration system using a 20000 MWCO "Ultrasart" cassette. The membrane surface area was 0.7 m$^2$, the recirculation rate being 17 liters/min. The inlet pressure (P1) was 30 psi, the retentate pressure (P2) was 10 psi, and the permeate pressure (P3) was 0 psi. The trans-membrane pressure was constant at 20 psi during the 4.5 hour processing time.

With this tangential-flow filtration device, the protein remained in the recirculating retentate, and the protein solution became increasingly concentrated. The protein-free media was collected as permeate.

The 30 psi inlet pressure remained constant for the first 4 hours, after which the inlet pressure slowly increased to 35 psi. This increase in inlet pressure was due to increasing viscosity of the protein solution (retentate) which became increasingly concentrated as the ultrafiltration progressed. In response to the increased inlet pressure, the valve 30 at the sensor S2 progressively opened, resulting in a simultaneous decrease in the retentate pressure 25 psi. This decrease was required to maintain the constant TMP of 20 psi. The permeate pressure remained constant throughout the filtration run. The average system flux over the 4.5 hours was 158 liters/m$^2$ -hr at the 20 psi TMP.

An electronic flow transmitter (Burkert Model SE 35/8035) with a 4–20 mA output was used to control the pump output of the lobe pump. The lobe pump, as is typical of lobe pumps, has its output affected both by solution viscosity and back-pressure. The system was able to maintain a constant pump rate of 17 liters/minute by having the flow meter transmitter signal control the pump motor speed to this desired level. Thus, increasing solution viscosity and pressure tend to change pump output, which is automatically compensated by the closed loop control feature so that the pump motor speed is restored to the original pump output setting.

It will be understood that the embodiments of the present invention which have been described are illustrative of some of the applications of the principles of the present invention. Various modifications may be made by those skilled in the art without departing from the true spirit and scope of the invention.

What is claimed is:

1. An apparatus for high-precision filtration of pharmaceutical or biotechnology liquids while maintaining a substantially constant trans-membrane pressure across a filtration unit of the apparatus, comprising:

a reservoir for containing a pharmaceutical or biotechnology liquid, the liquid containing filterable material dissolved or suspended within a carrier liquid;

a filtration unit having an inlet, a filtrate outlet and a retentate outlet, said filtration unit receives the liquid to be filtered through the inlet and separates at least some of the filterable material therefrom which passes as filtrate through said filtrate outlet, and a retentate of the carrier liquid and residue filterable material passes from the retentate outlet;

conduit system which directs the liquid to be filtered from said reservoir to said inlet of the filtration unit and from the retentate outlet for return passage to said reservoir;

an inlet pressure sensor which determines pressure at the inlet of the filtration unit;

at least one further pressure sensor positioned along a location of said apparatus downstream of the filtration unit for monitoring pressure within said apparatus;

at least one valve downstream of the filtration unit for modifying pressure within said apparatus; and a processor-controlled pump unit which controls movement rate of the liquid through the filtration unit, said processor-controlled pump unit having control logic which receives data from said inlet pressure sensor and from said further pressure sensor, calculates the trans-membrane pressure across the filtration unit from said data, compares the thus calculated trans-membrane pressure with a selected trans-membrane pressure for the pharmaceutical or biotechnology liquid undergoing high-precision filtration, and if a deviation between the calculated and selected trans-membrane pressure occurs, signals said valve to operate to vary the pressure at said further pressure sensor so that the calculated trans-membrane pressure is maintained substantially constant to substantially coincide with the selected trans-membrane pressure.

2. The apparatus in accordance with claim 1, further including another said further pressure sensor which is another pressure sensor, and further including another valve positioned along another location of said apparatus; and the control logic receives data from the pressure sensors to calculate, compare and, if needed, modify the pressures to maintain the selected trans-membrane pressure.

3. The apparatus in accordance with claim 2, wherein said another pressure sensor senses, and said another valve modifies, the pressure generally at said filtrate outlet.

4. The apparatus in accordance with claim 2, wherein said another pressure sensor senses, and said another valve modifies, the pressure generally at said filtrate outlet; and wherein said further pressure sensor of claim 1 senses, and said valve of claim 1 modifies, the pressure generally at said retentate outlet.

5. The apparatus in accordance with claim 2, further including a flow meter along said conduit system between said pump unit and said inlet of the filtration unit, said flow meter monitors flow value thereat, which is transmitted to said control logic which directs the pump unit to modify the flow value to maintain a substantially constant feed rate into the filtration unit which substantially coincides with a selected flow value.

6. The apparatus in accordance with claim 1, wherein said further pressure sensor senses, and said valve modifies, the pressure generally at said retentate outlet.

7. The apparatus in accordance with claim 1, further including a flow meter along said conduit system between said pump unit and said inlet of the filtration unit, said flow meter monitors flow value thereat, which is transmitted to said control logic which directs the pump unit to modify the flow value to maintain a substantially constant feed rate into the filtration unit which substantially coincides with a selected flow value.

8. The apparatus in accordance with claim 1, further including a unit which detects the feed rate across the filtration unit and the amount of filtrate which passes through the filtrate outlet, and said control logic receives feed rate and filtrate amount data from said unit whereby a feed rate at which a significant drop of filtrate collection rate occurs is determined to be a minimum feed rate for the apparatus.

9. The apparatus in accordance with claim 1, wherein said control logic includes a capture and hold component which selects a peak pressure value at said pressure sensor, which peak pressure value is used in determining the calculated trans-membrane pressure.

10. The apparatus in accordance with claim 1, further including a unit which detects the amount of filtrate which passes through the filtrate outlet, and said control logic receives filtrate amount data from said unit, whereby a pressure value or a feed rate value is varied and the filtrate collection amount is monitored to detect an optimum pressure value or feed rate achieving a maximum collection rate, and said optimum pressure value or feed rate determines said selected trans-membrane pressure for the apparatus.

11. The apparatus in accordance with claim 1, wherein said control logic includes a stopping component which directs-ceasing of movement of the liquid by the processor-controlled pump unit.

12. The apparatus in accordance with claim 1, wherein said control logic includes a limit setting component which receives a user-input limit for low pressure data from said pressure sensor, and said control logic monitors said low pressure data and signals that the limit for low pressure has been attained.

13. The apparatus in accordance with claim 1, wherein said control logic includes a limit setting component which receives a user-input limit for high pressure data from said pressure sensor, and said control logic monitors said high pressure data and signals that the limit for high pressure has been attained.

14. The apparatus in accordance with claim 1, wherein said conduit system includes tubing of a selected size, wherein said control logic includes a limit setting component which receives a user-input indication of said selected size of the tubing, and wherein said control logic includes a calibration look-up table which relates a pump unit speed of rotation parameter with a pump unit output in terms of volume per unit time.

15. An apparatus for high-precision filtration of pharmaceutical or biotechnology liquids while maintaining a substantially constant feed rate, comprising:

a reservoir for containing a pharmaceutical or biotechnology liquid, the liquid containing filterable material dissolved or suspended within a carrier liquid;

a membrane filtration unit having an inlet, a filtrate outlet and a retentate outlet, said filtration unit receives the liquid to be filtered through the inlet and separates at least some of the filterable material therefrom which passes as filtrate through said filtrate outlet, and a retentate of the carrier liquid and residue filterable material passes from the retentate outlet;

a conduit system which directs the liquid to be filtered from said reservoir to said inlet of the filtration unit and from the retentate outlet for return passage to said reservoir;

at least one flow meter positioned along said conduit system for monitoring the flow rate within said conduit system; and a processor-controlled pump unit which controls movement rate of the liquid through the filtration unit, said processor-controlled pump unit having control logic which receives data from said flow meter to control flow of the liquid through said filtration unit, said control logic directing the pump unit to modify the flow rate detected by said flow meter to maintain a substantially constant feed rate into the membrane filtration unit which substantially coincides with a selected flow rate.

16. The apparatus in accordance with claim 15, wherein said flow meter detects changes in output of the pump unit due to changes in viscosity of the liquid in the reservoir, and said control logic modifies the output of the pump unit in view thereof.

17. The apparatus in accordance with claim 15, further including a pressure sensor positioned along said conduit system for monitoring pressure within the conduit system and transmitting the pressure to the control logic which directs the pump unit to modify its pumping rate in response to changes in the pressure so as to maintain the selected flow rate.

18. The apparatus in accordance with claim 17, wherein said control logic includes a capture and hold component which selects a peak pressure value at said pressure sensor, which peak pressure value is used in determining the calculated trans-membrane pressure.

19. The apparatus in accordance with claim 15, further including a unit which detects the feed rate across the filtration unit and the amount of filtrate which passes through the filtrate outlet, and said control logic receives feed rate and filtrate amount data from said unit whereby a feed rate at which a significant drop of filtrate collection rate occurs is determined to be a minimum feed rate for the apparatus.

20. The apparatus in accordance with claim 15, wherein said control logic includes a stopping component which directs ceasing of movement of the liquid by the processor-controlled pump unit.

21. The apparatus in accordance with claim 15, wherein said control logic includes a limit setting component which receives a user-input limit for low pressure data from said pressure sensor, and said control logic monitors said low pressure data and signals that the limit for low pressure has been attained.

22. The apparatus in accordance with claim 15, wherein said control logic includes a limit setting component which receives a user-input limit for high pressure data from said pressure sensor, and said control logic monitors said high pressure data and signals that the limit for high pressure has been attained.

23. The apparatus in accordance with claim 15, wherein said conduit system includes tubing of a selected size, wherein said control logic includes a limit setting component which receives a user-input indication of said selected size of the tubing, and wherein said control logic includes a calibration look-up table which relates a pump unit speed of rotation parameter with a pump unit output in terms of volume per unit time.

24. An apparatus for high-precision filtration of pharmaceutical or biotechnology liquids while maintaining a substantially constant feed rate, comprising:

a reservoir for containing a liquid, the liquid being a pharmaceutical or biotechnology liquid containing filterable material dissolved or suspended within a carrier liquid;

a filtration unit having an inlet, a filtrate outlet and a retentate outlet, said filtration unit receives the liquid to be filtered through the inlet and separates at least some of the filterable material therefrom which passes as filtrate through said filtrate outlet, and a retentate of the carrier liquid and residue filterable material passes from the retentate outlet;

a conduit system which directs the liquid to be filtered from said reservoir to said inlet of the filtration unit and from the retentate outlet for return passage to said reservoir;

at least one pressure sensor positioned along said conduit system for monitoring pressure within said conduit system; and a processor-controlled pump unit which controls movement rate of the liquid through the filtration unit, said processor-controlled pump unit having control logic which receives data from said pressure sensor, and said control logic directs the pump unit to modify its pumping rate in response to changes in pressure at the pressure sensor so as to maintain a substantially constant selected flow rate imparted to the liquid by the pump unit.

25. The apparatus in accordance with claim 24, wherein said control logic includes a stopping component which directs ceasing of movement of the liquid by the processor-controlled pump unit.

26. The apparatus in accordance with claim 24, wherein said control logic includes a limit setting component which receives a user-input limit for low pressure data from said pressure sensor, and said control logic monitors said low pressure data and signals that the limit for low pressure has been attained.

27. The apparatus in accordance with claim 24, wherein said control logic includes a limit setting component which receives a user-input limit for high pressure data from said pressure sensor, and said control logic monitors said high pressure data and signals that the limit for high pressure has been attained.

28. The apparatus in accordance with claim 24, wherein said conduit system includes tubing of a selected size, wherein said control logic includes a limit setting component which receives a user-input indication of said selected size of the tubing, and wherein said control logic includes a calibration look-up table which relates a pump unit speed of rotation parameter with a pump unit output in terms of volume per unit time.

29. A method for high-precision filtering of pharmaceutical or biotechnology liquids while maintaining a substantially constant trans-membrane pressure which substantially coincides with a selected trans-membrane pressure across a membrane filtration unit, comprising:

providing within a reservoir a liquid having a pharmaceutical or biotechnology filterable material dissolved or suspended within a carrier liquid;

providing a membrane filtration unit having an inlet, a filtrate outlet and a retentate outlet;

passing liquid to be filtered through the inlet of the filtration unit and separating at least some of the filterable material therefrom as filtrate from the filtrate outlet;

passing a retentate of the carrier liquid and residue filterable material from the retentate outlet;

directing the liquid from the retentate outlet and to the reservoir;

sensing the pressure of the liquid passing through the inlet to monitor an inlet pressure;

providing at least one pressure sensor and valve positioned along a location for monitoring outlet pressure and for modifying pressure at the filtrate outlet, at the retentate outlet, or at each of the filtrate outlet and retentate outlet;

controlling movement rate of the liquid through the filtration unit, including receiving data from the pressure sensor, calculating from the inlet pressure and the outlet pressure the trans-membrane pressure across the filtration unit, comparing the thus calculated trans-membrane pressure with a selected trans-membrane pressure, and if a deviation between the calculated and selected trans-membrane pressure occurs, varying the pressure at the pressure sensor so that the calculated trans-membrane pressure substantially coincides with the selected trans-membrane pressure across the membrane filtration unit.

30. A method for high-precision filtering of pharmaceutical or biotechnology liquids while maintaining a substantially constant feed rate, comprising:

providing a supply of pharmaceutical or biotechnology liquid containing filterable material dissolved or suspended within a carrier liquid;

providing a membrane filtration unit having an inlet, a filtrate outlet and a retentate outlet;

passing the liquid to be filtered through the inlet by operation of a pump unit;

separating at least some of the filterable material as filtrate and passing same through the filtrate outlet;

passing the retentate of the carrier liquid and residue filterable material from the retentate outlet and to the supply of liquid;

passing the liquid through a flow meter at a location upstream of the filtration unit; and controlling movement rate of the liquid through the filtration unit, including receiving data from the flow meter and directing the pump unit to modify the flow rate detected by the flow meter in order to maintain a substantially constant feed rate into the membrane filtration unit which substantially coincides with a selected flow rate.

* * * * *

UNITED STATES PATENT AND TRADEMARK OFFICE
CERTIFICATE OF CORRECTION

PATENT NO. : 6,350,382 B1
DATED : February 26, 2002
INVENTOR(S) : Schick

It is certified that error appears in the above-identified patent and that said Letters Patent is hereby corrected as shown below:

Column 1,
Line 36, after "other" delete "after".

Column 2,
Line 10, delete "build" and insert -- builds --.
Line 10, delete "causes" and insert -- causing --.
Line 40, after "present" insert -- invention --.

Column 4,
Line 58, delete "trans" and insert -- trans- --.

Column 5,
Line 15, delete "component,as" and insert -- component, as --.
Line 51, after "Toledo" insert -- , --.
Line 51, after "Sartorius®" delete "and".

Column 6,
Line 25, after "displayed by" delete "the".
Line 26, after "pump" delete "unit".
Line 37, after "A" delete "pump rate".

Column 10,
Line 63, after "Masterflex™" insert -- pump tubing --.

Column 12,
Line 22, before "conduit system" insert -- a -- .

Column 13,
Line 40, delete "directs-ceasing" and insert -- directs ceasing --.

UNITED STATES PATENT AND TRADEMARK OFFICE
CERTIFICATE OF CORRECTION

PATENT NO. : 6,350,382 B1
DATED : February 26, 2002
INVENTOR(S) : Schick

It is certified that error appears in the above-identified patent and that said Letters Patent is hereby corrected as shown below:

<u>Column 16,</u>
Line 25, after "retentate outlet;" insert -- and --.

Signed and Sealed this

Twenty-first Day of January, 2003

JAMES E. ROGAN
*Director of the United States Patent and Trademark Office*

UNITED STATES PATENT AND TRADEMARK OFFICE
CERTIFICATE OF CORRECTION

PATENT NO.       : 6,350,382 B1
APPLICATION NO.  : 09/603148
DATED            : February 26, 2002
INVENTOR(S)      : Karl G. Schick It is certified that error appears in the above-identified patent and that said Letters Patent is hereby corrected as shown below:

At Column 3, Line 62 delete "outlet 25" and insert --outlet 29--.

At Column 16, Line 63, claim 31 should be inserted:
--31. The method according to claim 29, further including passing the liquid through a flow meter at a location upstream of the membrane filtration unit; and controlling rate of movement of the liquid through the filtration unit, including receiving data from the flow meter and directing the pump unit to modify the flow rate detected by the flow meter in order to also maintain a substantially constant feed rate into the membrane filtration unit which substantially coincides with a selected flow rate.--.

Signed and Sealed this

Twenty-first Day of September, 2010

David J. Kappos
*Director of the United States Patent and Trademark Office*